3,721,569
METHOD FOR DEFATTING SOYBEAN MEAL
Keith H. Steinkraus, Geneva, N.Y., assignor to Cornell Research Foundation, Inc., Ithaca, N.Y.
No Drawing. Continuation-in-part of application Ser. No. 687,479, Dec. 4, 1967. This application Mar. 1, 1971, Ser. No. 119,846
Int. Cl. A23l 1/20
U.S. Cl. 99—98   2 Claims

ABSTRACT OF THE DISCLOSURE

Organoleptically bland soybean meal is prepared by extracting ground, unheated, unpressed soybeans with concentrated ethyl alcohol followed by a mixture of concentrated ethyl alcohol and chloroform. The meal, in addition to being completely defatted and debittered, is free of undesirable mouth-coating factor.

---

The present invention relates to the preparation of organoleptically bland defatted soybean meal.

This patent application is a continuation-in-part application of patent application No. 687,479 filed Dec. 4, 1967, now abandoned, same inventor as present application entitled Method for Defatting Soybean Meal.

It is well known to defat soybeans by extraction with solvents such as hexane and alcohol and to use the defatted protein containing residue in the preparation of various food products. Soybeans defatted commercially by the presently accepted art generally contain a residue of bound fat, principally phospholipid, amounting to about 1% or less. However, it is this residual bound fat that is responsible for much of the residual off-flavor or beaniness and instability in the product. While certain of the prior art extraction procedures have been partially successful in eliminating the characteristic bitter soybean taste, the defatted residue still contains an undesirable mouth-coating factor (or substance), also described as a lard-like taste which sticks in the throat. I have now discovered that the residual bound fat including the mouth-coating factor along with remaining bitterness can be removed by extraction with ethyl alcohol together with or followed by chloroform.

It is, therefore, a principal object of the present invention to provide an improved soybean defatting and debittering method which also removes the undersirable mouth-coating factor.

These and other objects and advantages of the present invention will become apparent on consideration of the extractive methods more fully described in the discussion and examples which follow:

The present invention is a method for the preparation of a defatted organoleptically bland soybean meal which comprises extracting ground, unheated, unpressed soybeans with undiluted ethyl alcohol (95%) together with or followed by chloroform. It is essential in the practice of the present invention that the alcohol extraction precede or at least accompany the chloroform extraction step. The reason for this is that the alcohol treatment results in a loosening of the bond between bound fat, principally phospholipids, and the soybean protein enabling the mouth-coating factor, phospholipids and other undersirable flavor-bearing lipids to be extracted by the chloroform. The ethyl alcohol also extracts certain bitter principles from the soybeans contributing to the resulting organoleptically bland flavor while yielding a defatted soybean with an elevated protein content. Tests have shown that extraction with ethyl alcohol alone, chloroform alone, or even chloroform followed by alcohol will not result in removal of the bound fat including the mouth-coating factor. Sequential application of ethyl alcohol followed by an application of chloroform or an ethyl alcohol-chloroform mixture results in a substantially complete removal of bound fat including the mouth-coating factor. It is not necessary to remove the ethyl alcohol between the two steps.

The undiluted at least 95% ethy lalcohol of commerce is employed in practicing the present invention. A more efficient extraction of the lipids and other factors results when ground, unheated, unpressed soybeans are contacted with fresh portions of the warm alcohol, i.e., a few degrees below its boiling point; further efficiency is obtained by stirring the ground beans with the alcohol extractant, Similar coonsiderations apply to the extraction of the soybeans with chloroform or chloroform-ethyl alcohol mixtures.

In its preferred embodiments, the present process utilizes a Soxhlet apparatus or its equivalent for extraction. Briefly, the solvent or solvent mixture employed is placed in a flask and heated to boiling. Solvent vapors rise into a water cooled condenser, are condensed, and drip into a chamber which contains ground raw soybeans in a thimble or cloth bag between the flask containing the solvent and the condenser. The solvent collects in the chamber until it rises above the top of the thimble or cloth bag. It then syphons out of the chamber and down to the solvent flask carrying with it the substances extracted from the ground beans. The solvent is revaporized and recondensed in each extraction cycle and the beans are extracted each time with fresh solvent avoiding recontamination with matter previously extracted by the solvent. It has been found that the solvent condenses and falls into the ground soybeans at temperatures of about 60 to 65° C. for ethyl alcohol (95%) (boiling point 78° C.), about 50 to 55° C. for chloroform (boiling point 62° C.) and about 50 to 55° C. for 1:1 (v./v.) chloroform:alcohol (boiling point about 59° C.). The exact temperatures in the extraction thimble will vary somewhat depending on the size of the system employed.

In a preferred aspect of the present method, the ground soybeans are extracted for about 2 hours with 95% ethyl alcohol. During this time not only are the alcohol solubles removed from the soybeans, but the bean materials are heated to 60 to 65° C. thereby promoting the liberation of bound lipids. A second extraction step using chloroform or preferably a 1:1 (v./v.) chloroform to ethyl alcohol mixture is carried out for about twenty-two hours or until residual lipid has been extracted. When using such a mixed solvent system, it is not necessary to dry or otherwise remove all of the alcohol prior to the introduction of chloroform into the extraction system. The spent solvents after extraction are recovered by conventional methods, e.g., by distillation, for resuse in the extraction procedure.

EXAMPLE 1

The extraction of pulverized, unheated, unpressed Harasoy soybeans with 95% ethyl alcohol for two hours followed by extraction with a 1:1 (v./v) mixture of chloroform-ethyl alcohol for twenty-two hours in a Soxhlet apparatus was compared with the method of U.S. Pat. 1,297,668 to Erslev wherein extraction with a fat solvent is followed by extraction with alcohol. In this comparative example, the same apparatus and extraction times were employed in both sequences. Thus, the differences summarized below are attributed to the order in which the solvents were applied and not to the fact that warm solvents were utilized.

|  | Present process, ethanol/ ethanol+ chloroform, percent | Erslev process, chloroform/ ethanol, percent |
| --- | --- | --- |
| Total solids extracted | 26.2 | 24.1 |
| Solids extracted in first step | 20.6 | 20.2 |
| Solids extracted in second step | 5.6 | 3.9 |
| Nitrogen content (defatted product) | 8.79 | 7.92 |

It should be noted that operation according to the present method extracts more total solids but leaves a product higher in nitrogen, i.e., protein, than that produced by the Erslev process. The present method yields a bland, almost tasteless meal whereas the Erslev process yields a meal with a cereal-like flavor. Moreover, aqueous extracts of the non-fat soysolids produced by the present process are nearly colorless, very bland in taste and do not coat the mouth whereas similar extracts prepared from Erslev processed soysolids are light tan in color, cereal-like in flavor and coat the mouth badly.

The method of Example 1 was compared with a method similar to U.S. Pat. No. 1,260,656 to Bollmann in which Harasoy soybeans were slightly roasted and dry-pressed at 20,000 p.s.i. to release part of the oil and then were extracted hot with chloroform and undiluted (95%) alcohol (120:80 w./w.). Chloroform was substituted for benzene because studies of extractions with ethanol/benzene compared with ethanol/chloroform had shown that a 13 member taste panel not only could detect the differences in flavors but preferred the flavors of soybean products defatted with ethanol/chloroform. It was found that the Bollmann process left a residue of fat amounting to 0.77 to 0.86% while the method described in Example I left no residual fat in the product. It is this residual fat that leaves a disproportionate amount of undesirable off-flavor in the defatted material and it is this residual fat that leads to great flavor instability in the product. Soybeans defatted by the modified Bollmann process still contained a bitter, astringent flavor. In addition the protein content of the soybean defatted by the Bollmann process was 6.5% less than that of the product defatted and deflavored by the process in Example 1.

The adverse effect of water on the solvent extraction system is reported by Forstmann et al. (U.S. Pat. No. 2,615,905). They use solvent systems comprised of water, diluted ethyl alcohol (10–50%) and a fat solvent such as chloroform. They report that their defatted products contain a small amount of residual oil. The removal of this residual oil, including bound fat, phospholipids and mouth-coating factor, is one of the principal discoveries of the present process.

Furthermore, even slight roasting of the beans results in amino acid, sugar reactions which makes all these components, including proteins, less soluble. Dry pressing not only results in excessive application of heat, but it compacts the bean tissues, ruptures cells releasing the free oil, and also releases enzymes such as lipoxides which immediately catalyze numerous undesirable reactions such as oxidation of fats and fatty acids with production of off-flavors, rancid flavors, etc. It is difficult or impossible to remove the additional off-flavors which result.

The significance of the applicant's theories are technically supported by the prior art. For example, reference is made to page 2 of the patent to Erslev, lines 22 thru 24, column 1, wherein it is stated "such heating renders coloring matter, mucilaginous substances and soluble albumins, insoluble in the fat solvent used."

The following examples illustrate that the aqueous extracts obtained from soybeans defatted according to the method of the present invention can be combined with fats, lactose and other components to produce a highly acceptable and improved synthetic cow's milk. Such aqueous extracts with or without added fats can also be utilized to make an acceptable extended cow's milk product.

EXAMPLE 2

Unheated, unpressed Harasoy soybeans were powdered and extracted for twenty-four hours in a Soxhlet extractor with 1:1 (v./v.) chloroform-ethanol. The resultant meal was dried in a vacuum oven at 40° C. to remove residual solvent and reground in a power mill. Twenty-five grams of the reground meal was beaten in a Waring blender with 150 milliliters of water and the insoluble residue separated by centrifugation. To separate 60 milliliter portions of the resultant aqueous soy base there was added two grams of a lightly salted, sweet cream butter melt and two grams of refined soy oil. After further blending, the soymilk samples were brought to a boil to destroy trypsin inhibitor. Taste panel tests showed that the sample containing butterfat was very similar to and almost indistinguishable from cow's milk in consistency, appearance and flavor. The sample containing the refined soy oil was superior to conventional soymilk products but did not have a cow's milk flavor.

EXAMPLE 3

Additional Harasoy soy flour was deffatted as in the previous example. The defatted meal (250 grams) was slurried with two liters of water in a Waring blender and centrifuged at 8000 r.p.m. for 10–15 minutes. The supernatant was filtered through glass wool to remove any additional solid particles and heated to boiling. Lightly salted melted butter was added, and the samples were homogenized at 7700 p.s.i., bottled and sterilized for 15 minutes at 250° F. A test panel of 15 tasted and compared the soymilk containing 3.5% added butterfat with a 1:1 soy-whole milk mixture and with 100% whole milk. The panel rated whole sterile milk 6.5, 1:1 soy-whole milk 6.3, and soymilk 4.6 on a scale of 10. These tests indicate that cow's milk could be diluted 1:1 with soymilk prepared according to the present invention and still be rated almost equivalent to whole cow's milk.

The same general procedure was employed to prepare artificial milk from commercially available low fat and defatted soy flours. Since preliminary tests indicated that the low fat flour yielded a slightly better flavor than the defatted flour, only the samples made from the low fat extract were submitted to the taste panel. Whole cow's milk and 1:1 soy-whole milk showed up distinctly better than the artificial milk made from the low fat soy flour extract containing either butterfat or refined soy oil as the fat added. This would indicate that conventional low fat and defatted soy flour do not give as acceptable a product as that obtained using soy meal prepared according to the method of the present invention.

EXAMPLE 4

An aqueous soy extract was prepared from Harasoy soybeans according to the method of Example 3. In order to make the samples more like cow's milk, 2% lactose was added and the fat content was raised to 3.75% using either lightly salted butter or refined soy oil. The samples and the 1:1 soy-whole milk used as the control were sterilized for 8 minutes at 250° F. Using a triangle test with a panel of 15 persons, only 9 could correctly pair the samples. Of thsese 9, 5 preferred the 1:1 soy-whole milk and 4 preferred the synthetic soymilk containing added butterfat. These tests indicate that the samples were very close in taste acceptability.

EXAMPLE 5

An aqueous soy base was prepared as in the previous example containing 2% lactose. Fat was added either as 3.75% butterfat or 3.75% butterfat free margarine; the samples were homogenized, bottled and sterilized for 8 minutes at 250° F. On triangle testing with a 14 member taste panel, only 10 could pair the samples correctly. Of these 10, 6 preferred the artificial soymilk to which margarine had been added while 3 preferred the artificial soymilk prepared from the same aqueous base but to which butterfat had been added. These tests indicate that butterfat-free margarine can be used to impart an acceptable milk flavor to artificial soymilk prepared from soybean meal defatted according to the method of the present invention.

The present invention does not require that the solvent be removed after the initial extraction with 95% ethyl alcohol. It is, of course, apparent that the reason that complete removal of the alcohol is not required in the present invention after the first step is that undiluted 95% alcohol is used and there is no excess water present to interfere with the subsequent extraction with chloroform. The ethyl alcohol has performed its essential function during the first step and its presence in the second extraction does not interfere with the function of the chloroform.

While the teaching of the present invention has been described as being practiced with Harasoy soybeans, it should be clear to those skilled in the art that other varieties such as Clark might also be used.

While in the example whenever a mixture 95% ethyl alcohol and chloroform is used in the second extraction step, a 1:1 (v./v.) proportion is used, it should be clear that the actual proportions can vary from zero percent ethyl 95% alcohol to fifty percent of the total mixture.

I claim:
1. A method for the preparation of organoleptically bland defatted soybean meal, from ground or pulverized unpressed and unroasted raw soybeans comprising the sequential steps of:
   (a) extracting bitter principles from the soybeans and loosening the bond between bound fat, principally phospholipids, and the soybean protein by
      (1) contacting said ground or pulverized unpressed and unroasted raw soybeans with a solvent consisting solely of 95% ethyl alcohol, warmed to a temperature of about 60° to about 65° C.; and
      (2) removing only a portion of the 95% alcohol solvent leaving the remaining portion in contact with the soybean protein;
   (b) followed by extracting the liberated lipids and other undesirable flavor-bearing lipids from the extracted soybean of step (a) enabling the mouth coating factor to be removed with an extracting solvent warmed to a temperature of from about 50° to about 55° C. and selected from the group consisting of chloroform and a chloroform-95% ethyl alcohol mixture containing not more than 50% ethyl alcohol (v./v.); and
   (c) drying the extracted ground soybean to remove all residual solvents.

2. The method according to claim 1 wherein the extracting solvent of step (b) is a mixture of chloroform and 95% ethyl alcohol containing not more than 50% ethyl alcohol (v./v.) and the extraction steps are conducted continuously with fresh portions of warm solvents.

References Cited
UNITED STATES PATENTS

| 1,260,656 | 3/1918 | Bollmann | 99—98 |
| 2,615,905 | 10/1952 | Frostmann et al. | 99—98 X |

A. LOUIS MONACELL, Primary Examiner

W. A. SIMONS, Assistant Examiner

U.S. Cl. X.R.

260—123.5, 412.2, 412.4